(12) United States Patent
Ito et al.

(10) Patent No.: US 7,778,764 B2
(45) Date of Patent: Aug. 17, 2010

(54) FUEL INJECTION CONTROL APPARATUS AND METHOD FOR A MULTI-FUEL ENGINE, AND ENGINE INCORPORATING SAME

(75) Inventors: Atsushi Ito, Saitama (JP); Yoichi Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/378,686

(22) Filed: Feb. 18, 2009

(65) Prior Publication Data
US 2009/0248279 A1    Oct. 1, 2009

(30) Foreign Application Priority Data
Mar. 31, 2008    (JP) .............................. 2008-093025

(51) Int. Cl.
*F02D 41/30*    (2006.01)
(52) U.S. Cl. ....................... 701/104; 701/109; 123/672; 123/486
(58) Field of Classification Search ................. 123/672, 123/703, 480, 486; 701/103–105, 109–110; 60/285–286
See application file for complete search history.

(56) References Cited
U.S. PATENT DOCUMENTS
7,475,683 B2 *   1/2009   Kokubu, Shiro ............ 123/672

FOREIGN PATENT DOCUMENTS
JP    2004-293491    10/2004

* cited by examiner

*Primary Examiner*—Hai H Huynh
(74) *Attorney, Agent, or Firm*—Carrier, Blackman & Associates P.C.; Joseph P. Carrier; William D. Blackman

(57) ABSTRACT

A fuel injection control apparatus for a multi-fuel engine can optimize a fuel injection quantity, using only one basic injection map, irrespective of alcohol concentration of a fuel. An E-concentration determining apparatus determines alcohol concentration of a fuel, based on a measured oxygen amount in exhaust. Basic injection quantities are stored in a basic injection map. E-concentration coefficients are stored in an E-concentration coefficient table for a plurality of alcohol concentrations in the fuel. A basic injection quantity, corresponding to a current rotary engine speed and a throttle opening, is selected from the basic injection map. A concentration coefficient, corresponding to the alcohol concentration and the basic injection quantity, is selected from the E-concentration coefficient table. A fuel injection quantity calculator determines an applied fuel injection quantity by multiplying the basic injection quantity by the concentration coefficient. Further adjustments using a number of additional correction coefficients may be made, as needed.

20 Claims, 7 Drawing Sheets

FUEL INJECTION CONTROL APPARATUS AND METHOD FOR A MULTI-FUEL ENGINE, AND ENGINE INCORPORATING SAME

CROSS-REFERENCE TO RELATED APPLICATIONS

The present invention claims priority under 35 USC 119 based on Japanese patent application No. 2008-093025, filed on Mar. 31, 2008. The entire subject matter of this priority document, including specification claims and drawings, is incorporated by reference herein.

BACKGROUND OF THE INVENTION

1. Field of the Invention

The present invention relates to a fuel injection control apparatus for a multi-fuel engine. More particularly, the present invention relates to a fuel injection control apparatus for a multi-fuel engine, which is capable of setting, without preparing a basic injection map which determines an injection quantity of fuel for a plurality of operation state of the engine for every alcohol concentration, an optimum fuel injection quantity based on only one basic injection map, irrespective of measured alcohol concentration.

2. Description of the Background Art

Recently, from a viewpoint of protecting an environment, as one of substitute fuels for fossil fuels, an alcohol fuel is considered as a promising fuel, and a vehicle which is capable of operating using an alcohol mixed fuel produced by mixing alcohol and gasoline besides gasoline, e.g. a Flexible Fuel Vehicle (FFV) has been developed.

The alcohol mixed fuel differs from fuel consisting of 100% of gasoline with respect to a heat value and an evaporation characteristic. At the same time, the alcohol mixed fuels differ from each other in characteristics depending on alcohol concentration indicative of a mixing rate of alcohol relative to gasoline.

Accordingly, when an alcohol mixed fuel is used in an engine which premises on the use of fuel consisting of 100% of gasoline, a control air/fuel ratio falls outside a theoretical air/fuel ratio. As a result, there may be a possibility that contents of an exhaust are changed or drivability of the vehicle is changed.

In order to overcome such drawbacks of using alcohol mixed fuels, the Japanese patent document JP-A-2004-2934911 discloses a system for performing correction of fuel injection quantity corresponding to alcohol concentration which is corrected to a value in the vicinity of approximately intermediate concentration.

In the system of the related art, disclosed in the Japanese patent document JP-A-2004-2934911, it is difficult to correlate a fuel injection quantity to an actual change of alcohol concentration. At the same time, even when a fuel injection map which determines a correlation between an operation state of an engine and a fuel injection quantity is provided, it is necessary to provide the fuel injection map for every alcohol concentration of fuel. Hence, it is necessary to update all fuel injection maps every time the specification of the engine is changed.

The present invention has been made to overcome such drawbacks of the existing fuel injection system. Accordingly, it is one of the objects of the present invention to provide an apparatus and a method of a fuel injection control for a multi-fuel engine which can overcome the above-mentioned drawbacks of the prior art, and can acquire a proper fuel injection quantity using only one basic injection map irrespective of alcohol concentration of fuel.

SUMMARY OF THE INVENTION

In order to achieve the above object, the present invention is characterized by providing an apparatus for and method of fuel injection control for controlling an applied injection quantity of an alcohol mixed fuel into an engine, based on a detected oxygen concentration in an exhaust gas.

The present invention according to a first aspect thereof provides a fuel injection control apparatus for a multi-fuel engine. The fuel injection control apparatus includes an oxygen sensor which is configured to measure the oxygen concentration in the exhaust gas; a alcohol concentration-determining apparatus which is configured to determine alcohol concentration of fuel based on a measured value of the oxygen concentration; a basic injection map which is configured to set a basic injection quantity of the fuel for a plurality of operation states of the engine; and an alcohol concentration coefficient table which is configured to set an alcohol concentration coefficient for a plurality of combinations of the basic injection quantity of the fuel and the alcohol concentration of the fuel.

The fuel injection control apparatus for a multi-fuel engine, according to the first aspect of the present invention, further includes an injection quantity selector which is configured to select currently applicable basic injection quantity, corresponding to a current operation state of the engine from the basic injection map; an alcohol concentration coefficient selector, which is configured to select the alcohol concentration coefficient corresponding to the alcohol concentration of the fuel and the basic injection quantity of the fuel from the alcohol concentration coefficient table; and an applied injector quantity calculator, which is configured to calculate a fuel injection quantity based on the basic injection quantity and the alcohol concentration coefficient.

According to a second aspect of the present invention, the fuel injection control apparatus is characterized in that the alcohol concentration coefficient is set such that the smaller the basic injection quantity, the higher the alcohol concentration coefficient becomes.

According to a third aspect of the present invention, the fuel injection control apparatus is characterized in that the alcohol concentration coefficient is set to an approximately fixed value when the basic injection quantity is greater than or equal to a predetermined injection quantity.

Advantages of the Invention

According to the present invention, it is possible to acquire following advantageous effects.

According to the first aspect of the invention, the optimum fuel injection quantity can be acquired irrespective of the alcohol concentration of the fuel based on only one basic injection map, and the alcohol concentration coefficient, which uses the basic injection quantity which can be set for every alcohol concentration as a parameter without providing the basic injection map of fuel for every alcohol concentration. Accordingly, even when it is necessary to review the fuel injection quantity due to a change of the specification of the engine or the like, man-hours for reviewing the basic injection map can be significantly reduced.

According to the second aspect of the present invention, although a rate of change of throttle opening and rotary engine speed with respect to the basic injection time is increased in a low-rotation region of the engine, it is possible to realize a stable control of engine operation by increasing an increment rate of the alcohol concentration coefficient.

According to the third aspect of the present invention, it is possible to properly control an air/fuel ratio without making the engine control overly complicated, even in a high-rotary speed range of the engine.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An illustrative embodiment of the present invention is described, with reference to the drawings.

Firstly, a basic concept of the present invention is explained. According to the present invention, a fuel injection quantity, corresponding to alcohol concentration of fuel, can be acquired using only one basic injection map. That is, for optimizing a fuel injection quantity irrespective of an alcohol concentration in the fuel, a fuel injection quantity acquired from one basic injection map is multiplied by an alcohol concentration coefficient, which uses a basic injection quantity for a plurality of alcohol concentrations as a parameter (hereinafter referred to as E-concentration coefficient), thus acquiring an applied fuel injection quantity corresponding to the alcohol concentration of the fuel.

Here, the fuel injection quantity depends on an intake air quantity which an engine requires, and conventionally, the fuel injection quantity is managed in a form of a basic injection map which adopts a rotary engine speed Ne and throttle opening TH (or intake vacuum Pb) as parameters. In this basic injection map, the fuel injection quantity is set for multiple combinations of the rotary engine speed Ne and the throttle opening TH (a grid point on the map) as exemplified by one example shown in FIG. 5.

Accordingly, the fuel injection quantity can be optimized irrespective of the alcohol concentration of the fuel, by setting the E-concentration coefficient for a plurality of alcohol concentrations with respect to each grid point, using only one basic injection map. However, such a method requires the registration of the E-concentration coefficient for several alcohol concentrations with respect to each grid point. Hence, the number of E-concentration coefficients becomes enormous.

Figure 5:
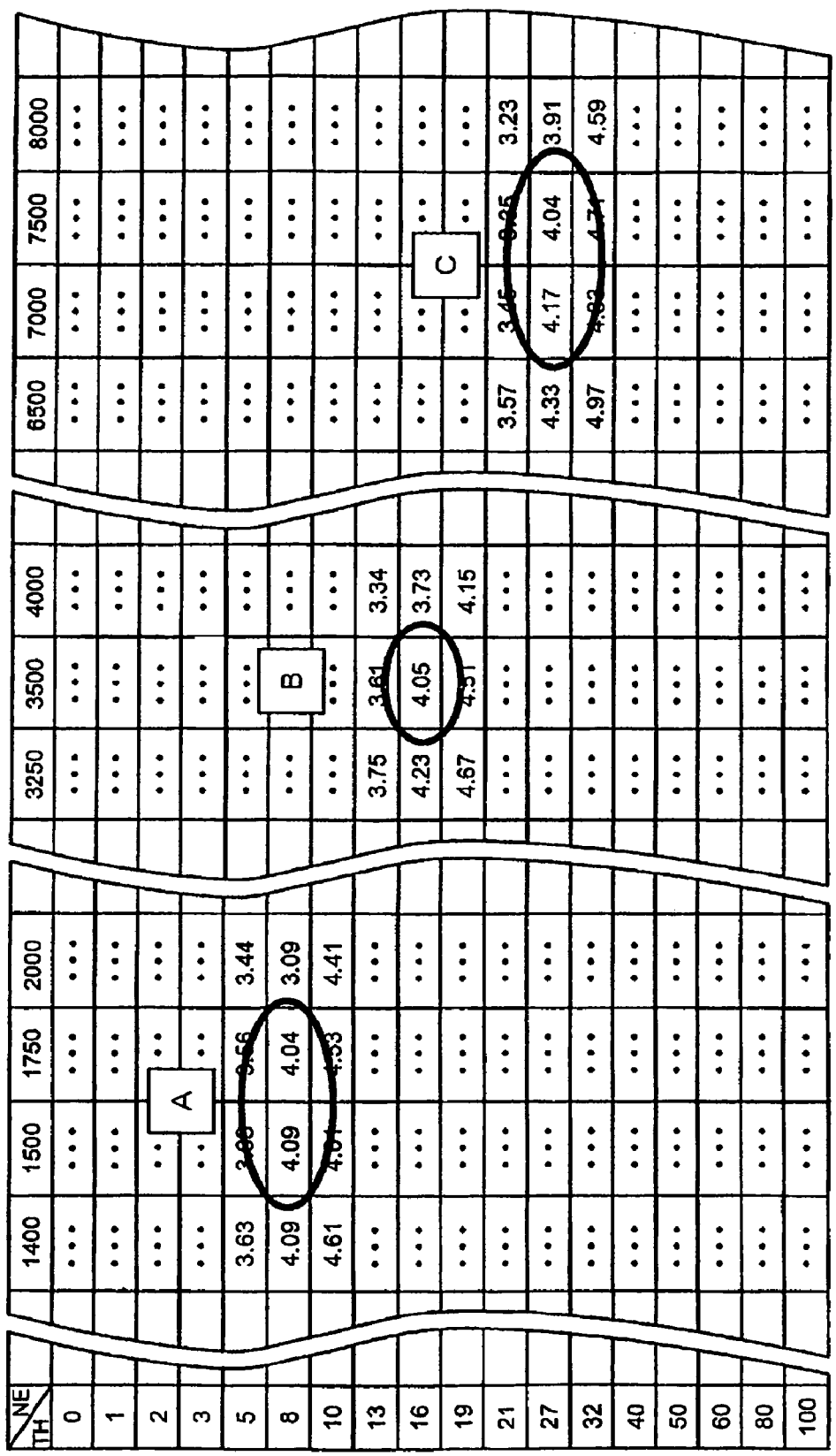
FIG. 5 is a view showing an example of a basic injection map.

On the other hand, by reference to the basic injection map shown in FIG. 5, as indicated by the grid points A, B, C in the drawing, a large number of grid points which has the same or similar fuel injection quantity exists. Further, based on results of an experiment and the like conducted by applicants of the present invention, it has been determined that with respect to the grid points which have the same or similar fuel injection quantity at the alcohol concentration which becomes the reference, also at other alcohol concentrations, the fuel injection quantities of the respective grid points become mutually equal to or substantially equal to each other at the same alcohol concentration, although an absolute quantity is changed for many alcohol concentrations.

Figure 6:
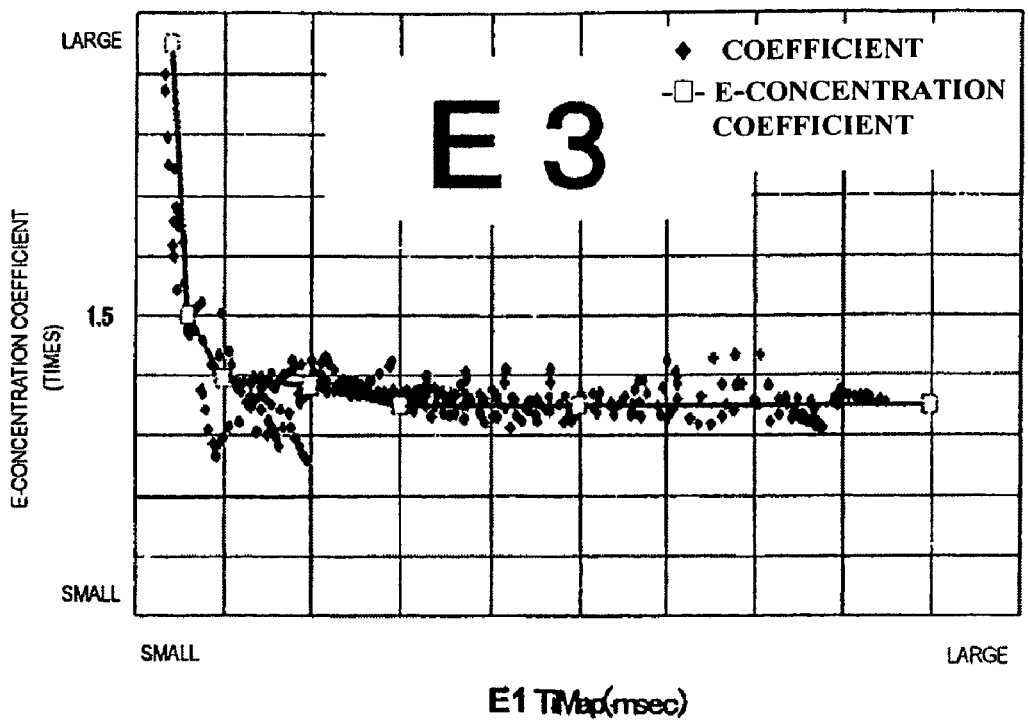
FIG. 6 is a comparison view of a fuel injection quantity when an alcohol concentration is at a first level (E1) and a fuel injection quantity when the alcohol concentration is at a third level (E3).

In FIG. 6, a fuel injection quantity $Ti_{map}$ of every grid point at a first level (E1) where the alcohol concentration is sufficiently low is taken on an axis of an abscissas, and an E-concentration coefficient ($Ke_3$) which is acquired by dividing the fuel injection quantity of the same grid point at a third level (E3), where the alcohol concentration is high, with a fuel injection quantity of the same grid point at the first level E1, is taken on an axis of ordinates.

It will be understood from FIG. 6, that the fuel injection quantity $Ti_{map}$ at the first level E1 and the E-concentration coefficient $Ke_3$ show a high correlation. Accordingly, and the fuel injection quantity at the third level E3 can be optimized irrespective of the grid point by multiplying the fuel injection quantity $Ti_{map}$ at the first level E1 by the E-concentration coefficient $Ke_3$.

Figure 7:
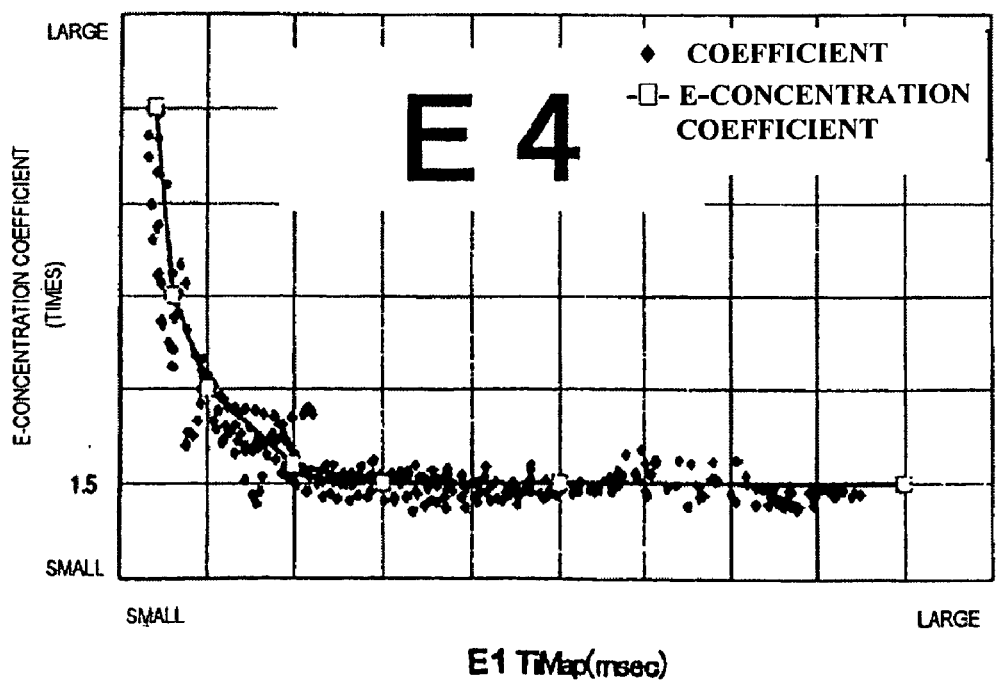
FIG. 7 is a comparison view of a fuel injection quantity when the alcohol concentration is at a first level (E1) and a fuel injection quantity when the alcohol concentration is at a fourth level (E4).

In a similar manner, in FIG. 7, a fuel injection quantity $Ti_{map}$ of each grid point at the first level (E1) which becomes the reference is taken on an axis of an abscissas, and an E-concentration coefficient ($Ke_4$) which is acquired by dividing a fuel injection quantity of the same grid point at a fourth level (E4) having sufficiently high alcohol concentration with a fuel injection quantity of the same grid point at the first level (E1) is taken on an axis of ordinates.

It will be understood from FIG. 7, that the fuel injection quantity $Ti_{map}$ at the first level E1 and the E-concentration coefficient $Ke_4$ show a high correlation. Accordingly, the fuel injection quantity at the fourth level E4 can be optimized, irrespective of the grid point, by multiplying the fuel injection quantity $Ti_{map}$ at the first level E1 which becomes the reference by the E-concentration coefficient $Ke_4$.

Figure 8:
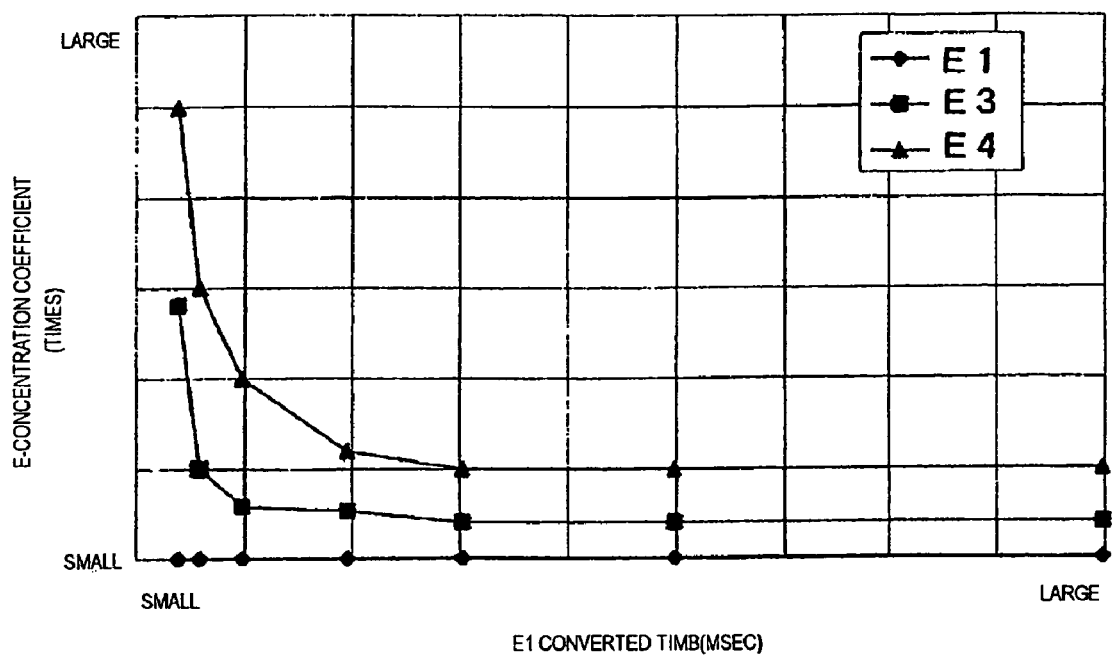
FIG. 8 is a comparison view among an E-concentration coefficient $Ke_1$ when the alcohol concentration is at a first level, an E-concentration coefficient $Ke_3$ when the alcohol concentration is at a third level, and an E-concentration coefficient $Ke_4$ when the alcohol concentration is at a fourth level.

Further, FIG. 8 is a view showing the relationship between the fuel injection quantity $Ti_{map}$ at the first level E1 which becomes a reference level, and the E-concentration coefficients $Ke_3$, $Ke_4$ at respective alcohol concentrations based on the above-mentioned result of experiment. It will be understood from FIG. 8, that a correlation is recognized between the basic injection quantity and the E-concentration coefficient acquired, based on many different alcohol concentrations.

In other words, it is understood that the smaller the basic injection quantity, the higher the E-concentration coefficient becomes, and the E-concentration coefficient becomes substantially fixed at a given level for the amount of alcohol present, when the basic injection quantity is set to a predetermined injection quantity or more.

The present invention has been made based on the above-mentioned results of experiments, and aims at providing an optimization of fuel injection quantities at many different alcohol concentrations, based on only one basic injection map, relating to certain alcohol concentrations and a plurality of E-concentration coefficients set with respect to some alcohol concentrations using the basic injection map as the reference.

Next, an illustrative embodiment for carrying out the present invention is explained in detail, in conjunction with the drawings.

Figure 1:
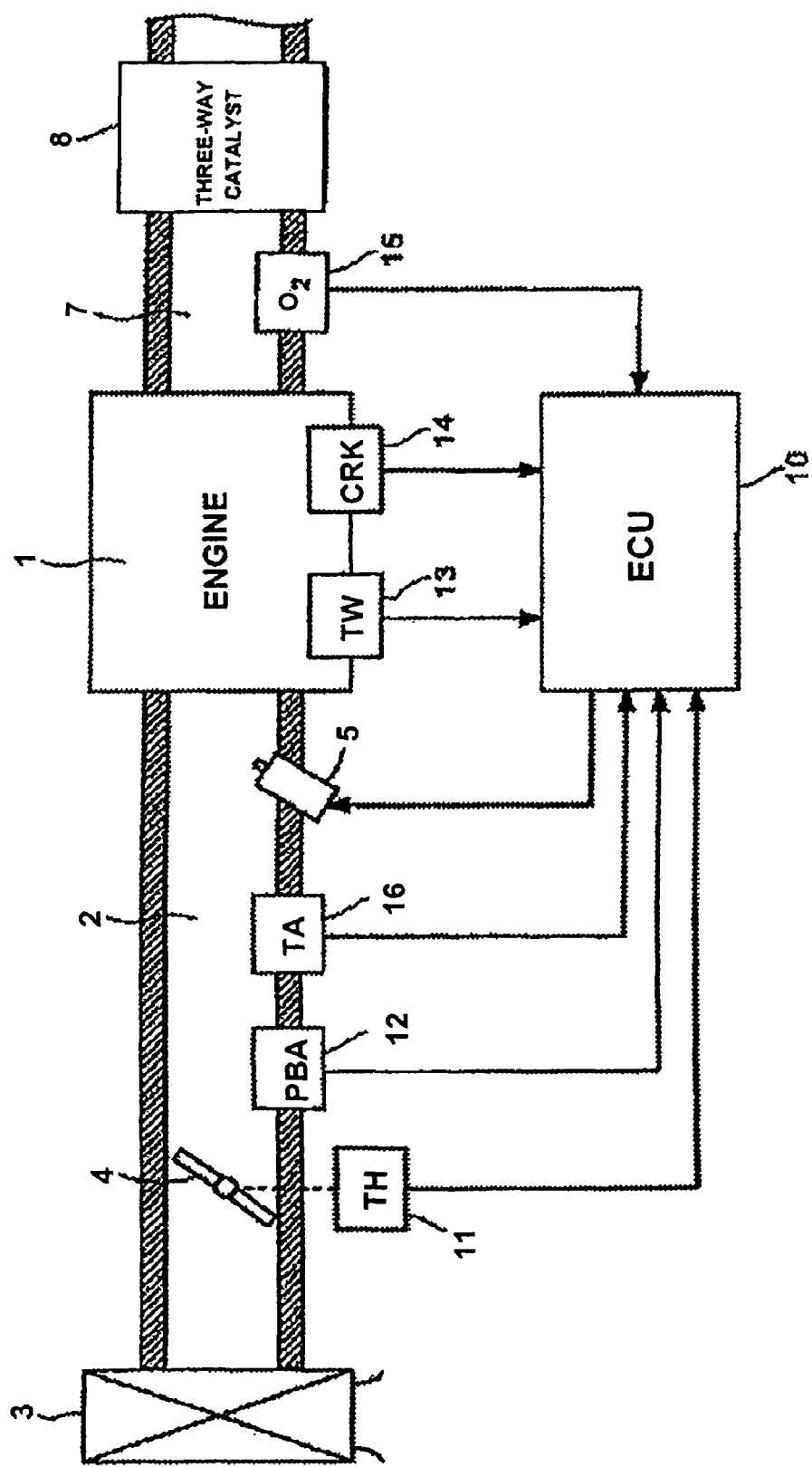
FIG. 1 is a simplified schematic diagram showing an internal combustion engine to which a fuel injection control apparatus of the present invention is applied, and a fuel injection control system of the internal combustion engine.

FIG. 1 is simplified schematic diagram showing an internal combustion engine to which a fuel injection control apparatus of the present invention is applied, and a fuel injection control system of the internal combustion engine.

Referring to FIG. 1, an intake pipe 2 and an exhaust pipe 7 are connected to an engine 1, and an air cleaner 3 is arranged at an upstream side of the intake pipe 2. An amount of intake air admitted to the engine 1 is regulated by a throttle valve 4 disposed inside the intake pipe 2. A position of the throttle valve 4 in the intake pipe 2 is detected by a throttle opening sensor (hereinafter referred as a TH sensor) 11.

An intake absolute pressure sensor (hereinafter referred as a PBA sensor) 12 measures an intake absolute pressure PBA at a position downstream of the throttle valve 4. An intake temperature sensor (hereinafter referred as a TA sensor) 16 measures an intake temperature TA in the intake pipe 2. A coolant temperature sensor (hereinafter referred as a TW sensor) 13 measures a temperature TW of liquid coolant within the engine 1. A crank angle sensor (hereinafter referred as a CRK sensor) 14 measures a crank angle CRK indicative of a crank position of the engine 1.

A three-way catalyst 8 is provided at a downstream side of the exhaust pipe 7, and an oxygen sensor (hereinafter expressed as an O2 sensor) 15. The O2 Sensor measures oxygen concentration of an exhaust gas in the exhaust pipe 7. The O2 sensor is arranged in the exhaust pipe 7 between the engine 1 and the three-way catalyst 8.

An engine control device (ECU: Electronic Control Unit) 10 executes various engine controls, including a fuel injection control, based on measured values outputted from the above-mentioned respective sensors. A fuel injector 5 is opened for a predetermined time, in response to an injection control signal outputted from the ECU 10, and injects gasoline or a mixed fuel containing mixed gasoline and alcohol.

Figure 2:
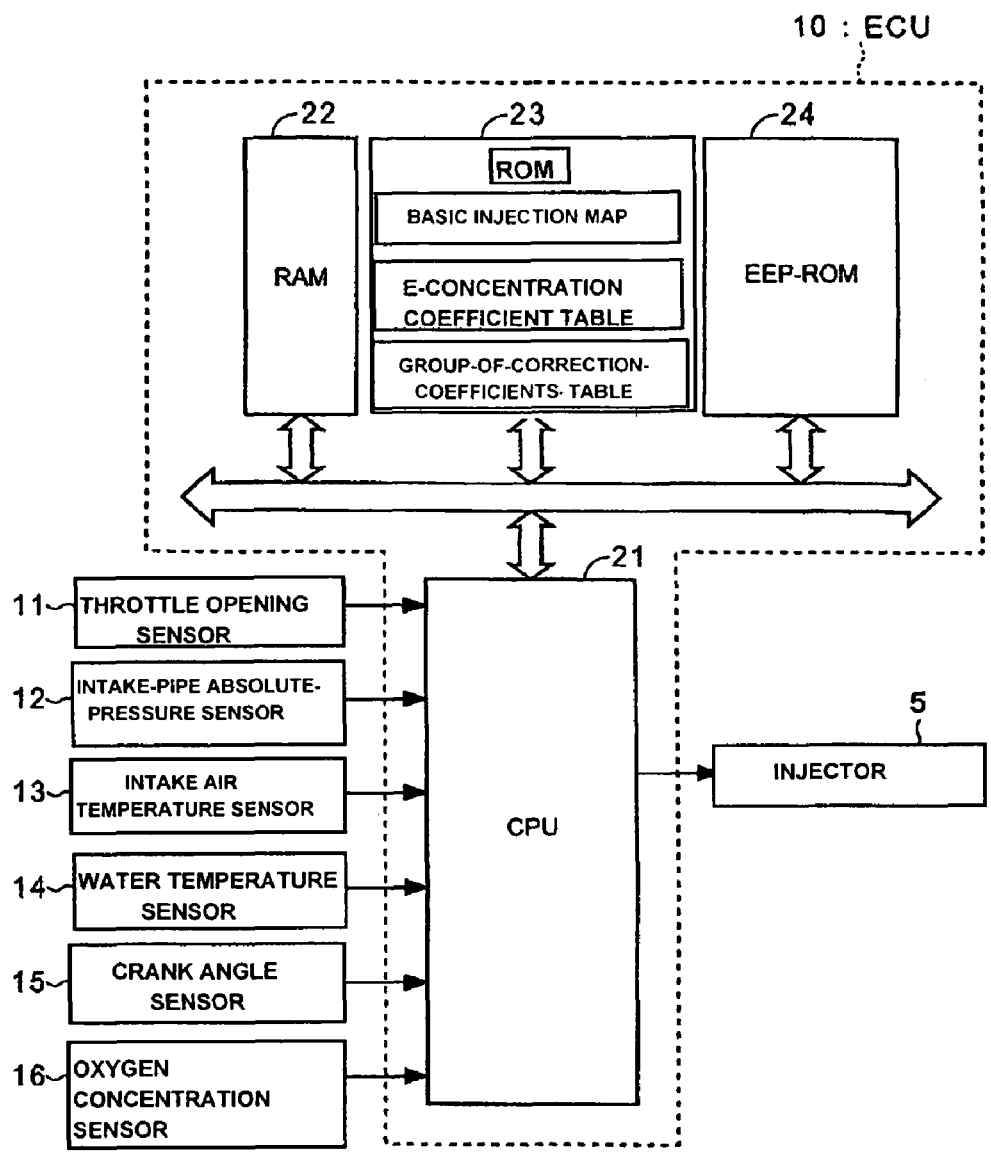
FIG. 2 is a functional block diagram showing a constitution of main elements of an ECU, which is one component of the fuel injection control system of FIG. 1.

FIG. 2 is a functional block diagram showing configuration main components of the ECU 10. Here, other components, which are not necessary for an explanation of the present invention, are omitted from the drawing.

The ECU 10 includes, as main components thereof, a CPU 21, a RAM 22 which provides a work area in the CPU 21, a ROM 23 in which programs executed by the CPU 21 and information for an injection control (a basic injection map of fuel, an E-concentration coefficient map, various correction coefficient tables and the like described later) are stored in a non-volatile manner, and an EEP-ROM 24 in which various control parameters are stored in a rewritable and non-volatile manner. The CPU 21 and various memory elements 22, 23, 24 are mutually connected with each other via an internal bus.

Figure 3:
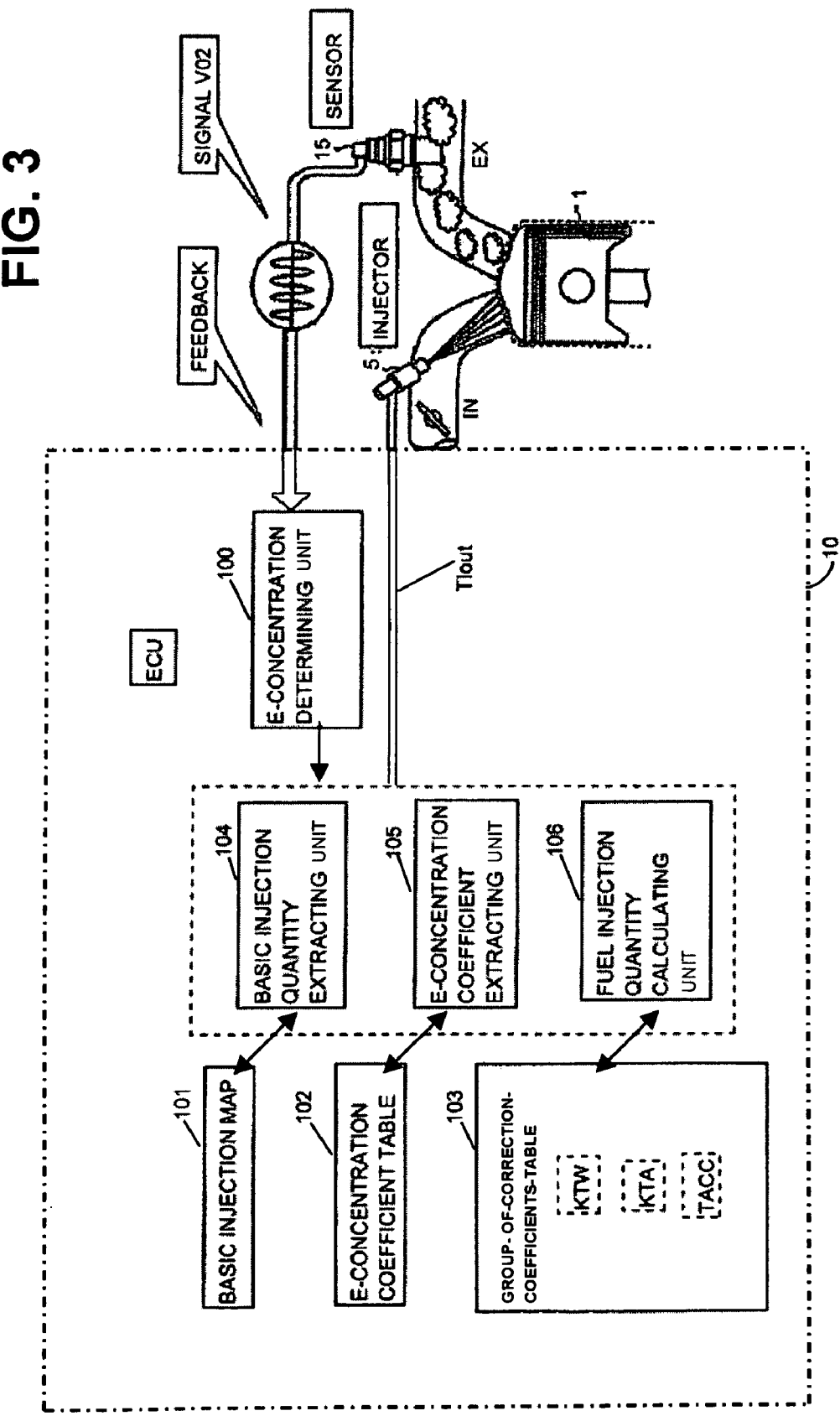
FIG. 3 is a functional block diagram of a fuel injection control apparatus according to an illustrative embodiment of the present invention.

FIG. 3 is a block diagram which functionally expresses the constitution of the fuel injection control apparatus of the present invention.

An E-concentration determining unit 100 determines alcohol concentration (ethanol concentration in this embodiment) based on a measured value of voltage VO2 of the O2 sensor 15. In the basic injection map 101 of fuel, the optimum basic injection quantity $Ti_{map}$ when the alcohol concentration is at the first level (E1) is stored in a map form which uses a rotary engine speed Ne and throttle opening TH as parameters.

In an E-concentration coefficient table (alcohol concentration coefficient table) 102, the E-concentration coefficient which is multiplied by the basic injection quantity $Ti_{map}$ for calculating the injection quantity Ti corresponding to the alcohol concentration is stored in a table form for every alcohol concentration of fuel.

In a group-of-correction-coefficients-table 103, inclusive of a correction coefficient table for acquiring an intake air temperature correction coefficient KTA which corresponds to an intake temperature TA acquired based on a measured result of the TA sensor 16, various correction coefficient tables for acquiring a water temperature correction coefficient KTW, an acceleration correction coefficient TACC, an environment correction coefficient and the like based on measured values of various sensors such as the TH sensor 11, the PBA sensor 12, the TW sensor 13, the CRK sensor 15 are stored.

A basic injection quantity selector (basic injection quantity extracting unit) 104 selects the basic injection quantity $Ti_{map}$ corresponding to the rotary engine speed Ne and the throttle opening TH, for example, from the basic injection map 101 as an engine parameter. An E-concentration coefficient selector (E-concentration coefficient extracting unit) 105 selects the E-concentration coefficient corresponding to the result of determination of the alcohol concentration acquired by the E-concentration determining unit 100 and the above-mentioned basic injection quantity $Ti_{map}$ from the above-mentioned E-concentration coefficient table 102.

A fuel injection quantity calculator (fuel injection quantity calculating unit) 106 calculates a fuel injection quantity $Ti_{out}$ injected from the injector 5 by multiplying the basic injection quantity $Ti_{map}$ by the E-concentration coefficient and, further, by adding various correction coefficients registered in the group-of-correction-coefficients-table 103 to such a value obtained by the multiplication or by further multiplying the value with the various correction coefficients.

Figure 4:
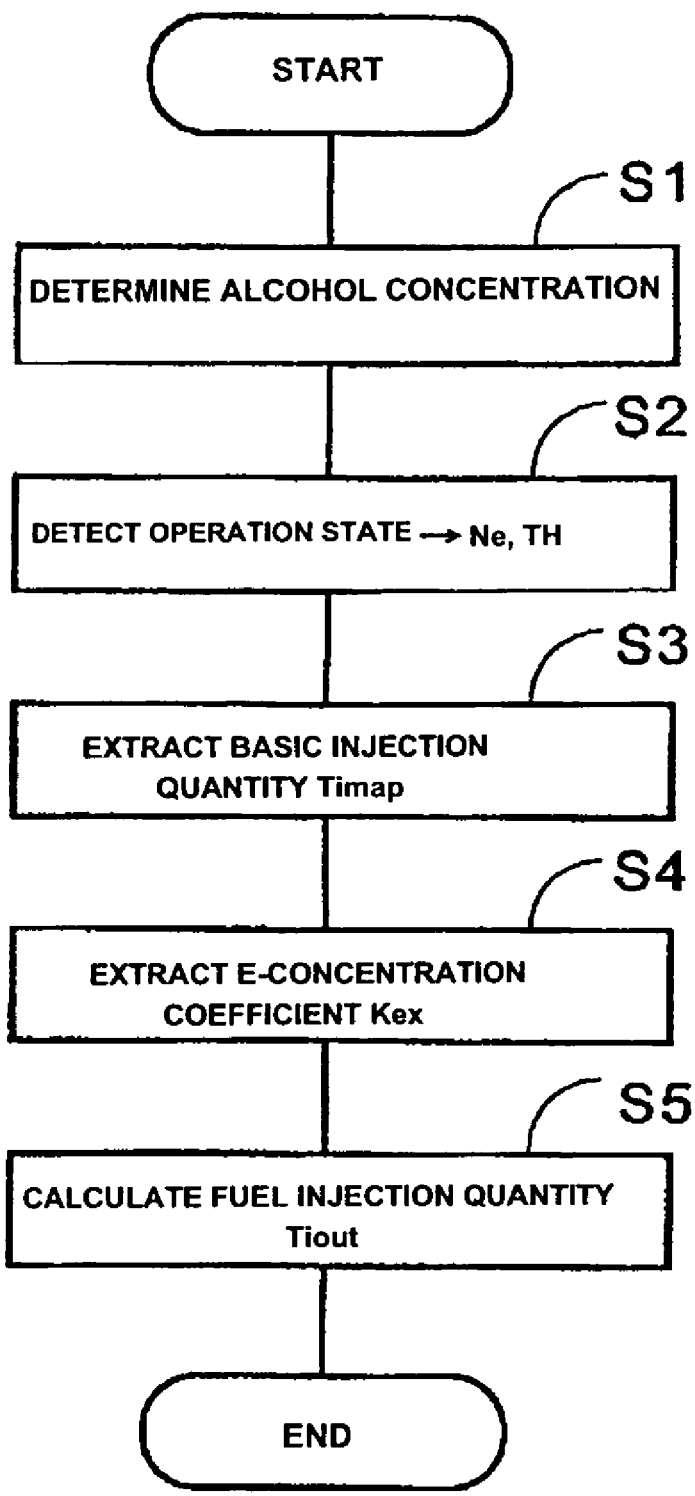
FIG. 4 is a flowchart showing an operation of the fuel injection control apparatus according to the embodiment shown in FIG. 3.

FIG. 4 is a flowchart showing an operation of the fuel injection control apparatus according to the illustrative embodiment, and the operation is repeated at a predetermined cycle during an operation of the engine.

In step S1, the E-concentration determining unit 100 determines the alcohol concentration based on the measured value (voltage) VO2 of the oxygen sensor 15. Here, the explanation is continued assuming that the alcohol concentration is determined to be at the third level (E3). In step S2, as the parameters indicative of an operation state of the engine, the rotary engine speed Ne and the throttle opening TH are received by the E-concentration determining unit 100. In step S3, the basic injection quantity selector 104 retrieves the basic injection map 101 based on rotary engine speed Ne and throttle opening TH as parameters, and selects the basic injection quantity $Ti_{map}$ corresponding to a present engine operation state.

In step S4, the E-concentration coefficient selector 105 retrieves the E-concentration coefficient table 102 based on alcohol concentration and basic injection quantity $Ti_{map}$, and selects the E-concentration coefficient $Ke_3$, which is multiplied by the present basic injection quantity $Ti_{map}$ for calculating the optimum injection quantity when the alcohol concentration is at the third level (E3).

Here, when the intermediate E-concentration coefficient corresponding to the result of the determination of the alcohol concentration is not yet registered in the E-concentration coefficient table 102, the E-concentration coefficient can be calculated by performing interpolation processing or extrapolation processing based on two E-concentration coefficients in the vicinity of the alcohol concentration.

In step S5, the basic injection quantity $Ti_{map}$ is multiplied by the E-concentration coefficient $Ke_3$, and the fuel injection quantity $Ti_{out}$ is calculated by suitably adding other correction coefficient to the multiplied value or by multiplying the multiplied value by other correction coefficient.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A fuel injection control apparatus for a multi-fuel engine, which is configured to control an injection quantity of an alcohol-mix fuel to said engine based on a measured oxygen concentration in an exhaust gas, the fuel injection control apparatus comprising:
    an oxygen sensor which is configured to measure an oxygen concentration in the exhaust gas, and to output a signal corresponding to the measured oxygen concentration;
    an alcohol concentration-determining apparatus which is configured to determine an alcohol concentration in the fuel, based on the measured oxygen concentration;
    a basic injection map which is configured to set a basic injection quantity of the fuel for a plurality of operation states of the engine; said basic injection map being recorded on a recordable medium;
    an alcohol concentration coefficient table which is configured to set an alcohol concentration coefficient for a plurality of combinations of the basic injection quantity of the fuel and the alcohol concentration of the fuel; said alcohol concentration coefficient table being recorded on a recordable medium;
    an injection quantity selector which is configured to select a currently applicable basic injection quantity, corresponding to a current operation state of the engine, from the basic injection map;
    an alcohol concentration coefficient selector, which is configured to select the alcohol concentration coefficient corresponding to the alcohol concentration of the fuel and the basic injection quantity of the fuel from the alcohol concentration coefficient table; and
    an applied injection quantity calculator, which is configured to calculate an applied fuel injection quantity based on the basic injection quantity and the alcohol concentration coefficient.

2. A fuel injection control apparatus for a multi-fuel engine according to claim 1, wherein the alcohol concentration coefficient is set such that the smaller the basic injection quantity, the higher the alcohol concentration coefficient becomes.

3. A fuel injection control apparatus for a multi-fuel engine according to claim 1, wherein the alcohol concentration coefficient is set to a fixed value when the basic injection quantity is greater than or equal to a predetermined injection quantity.

4. A fuel injection control apparatus for a multi-fuel engine according to claim 1, wherein said basic injection map includes a substantially similar basic injection quantity of the fuel at a number of different points therein correlating specified engine rotary speeds and throttle openings.

5. A fuel injection control apparatus for a multi-fuel engine according to claim 1, wherein said current operation state of the engine includes parameters associated with a current rotary engine speed and a throttle opening.

6. A fuel injection control apparatus for a multi-fuel engine according to claim 1, wherein when an intermediate alcohol concentration coefficient corresponding to determination of the alcohol concentration is not yet registered in the alcohol concentration coefficient table, the said intermediate alcohol concentration coefficient is calculated by performing one of interpolation and extrapolation processing.

7. The fuel injection control apparatus for a multi-fuel engine according to claim 1, wherein the basic injection quantity is one of a set of reference basic injection quantities stored in the basic injection map that are empirically derived based on a particular alcohol concentration, and wherein the applied injection quantity calculator is configured to use the basic injection quantity regardless of whether the alcohol concentration actually determined by alcohol concentration-determining apparatus differs from the particular alcohol concentration.

8. A method of determining an applied injection quantity of an alcohol-gasoline fuel mixture for a multi-fuel engine, said method comprising the steps of:
    a) measuring an oxygen concentration in exhaust gas from said engine, and outputting a signal corresponding to the measured oxygen concentration;
    b) determining an alcohol concentration in the fuel, based on the measured oxygen concentration;
    c) selecting a currently applicable basic injection quantity, corresponding to a current operation state of the engine, from a basic injection map;
    d) selecting an alcohol concentration coefficient corresponding to the measured alcohol concentration in the fuel and the selected basic injection quantity of the fuel; and
    e) calculating the applied injection quantity based on the selected basic injection quantity and the selected alcohol concentration coefficient.

9. A method of determining an applied injection quantity for a multi-fuel engine according to claim 8, wherein the alcohol concentration coefficient is set such that the smaller the basic injection quantity, the higher the alcohol concentration coefficient becomes.

10. A method of determining an applied injection quantity for a multi-fuel engine according to claim 8, wherein the alcohol concentration coefficient is set to a fixed value when the basic injection quantity is equal to or greater than a predetermined injection quantity.

11. A method of determining an applied injection quantity for a multi-fuel engine according to claim 8, further comprising a step of:
    f) opening a fuel injector solenoid valve for a predetermined time corresponding to the applied injection quantity calculated in step e).

12. A method of determining an applied injection quantity for a multi-fuel engine according to claim 8, wherein said basic injection map includes a substantially similar basic injection quantity of the fuel at a number of different points therein correlating engine rotary speeds and throttle openings.

13. A method of determining an applied injection quantity for a multi-fuel engine according to claim 8, wherein said current operation state of the engine includes parameters associated with a current rotary engine speed and a throttle opening.

14. A method of determining an applied injection quantity for a multi-fuel engine according to claim 8, wherein when an intermediate alcohol concentration coefficient corresponding to determination of the alcohol concentration is not yet registered in the alcohol concentration coefficient table, the said intermediate alcohol concentration coefficient is calculated by performing one of interpolation and extrapolation processing.

15. The method of determining an applied injection quantity for a multi-fuel engine according to claim 8, wherein the basic injection quantity is one of a set of reference basic injection quantities stored in the basic injection map that are empirically derived based on a particular alcohol concentration, and wherein the applied injection quantity is calculated using the basic injection quantity regardless of whether the alcohol concentration actually determined differs from the particular alcohol concentration.

16. In combination a multi-fuel engine and a fuel injection control apparatus for said multi-fuel engine, said fuel injection control apparatus comprising:
   an oxygen sensor which for measuring an oxygen concentration in the exhaust gas, and to output a signal corresponding to the measured oxygen concentration; said oxygen sensor being arranged in an exhaust pipe between said engine and a three-way catalyst disposed at a downstream side of the exhaust pipe;
   an alcohol concentration-determining apparatus for determining an alcohol concentration in the fuel, based on the measured oxygen concentration;
   a basic injection map for setting a basic injection quantity of the fuel for a plurality of operation states of the engine; said basic injection map being recorded on a recordable medium;
   an alcohol concentration coefficient table for setting an alcohol concentration coefficient for a plurality of combinations of the basic injection quantity of the fuel and the alcohol concentration of the fuel; said alcohol concentration coefficient table being recorded on a recordable medium
   an injection quantity selector for selecting a currently applicable basic injection quantity, corresponding to a current operation state of the engine, from the basic injection map;
   an alcohol concentration coefficient selector for selecting the alcohol concentration coefficient corresponding to the alcohol concentration of the fuel and the basic injection quantity of the fuel from the alcohol concentration coefficient table; and
   an applied injection quantity calculator for calculating an applied fuel injection quantity based on the basic injection quantity and the alcohol concentration coefficient.

17. A multi-fuel engine according to claim 16, wherein the alcohol concentration coefficient is set such that the smaller the basic injection quantity, the higher the alcohol concentration coefficient becomes.

18. A multi-fuel engine according to claim 16, wherein the alcohol concentration coefficient is set to a fixed value when the basic injection quantity is greater than or equal to a predetermined injection quantity.

19. A multi-fuel engine according to claim 16, wherein said current operation state of the engine includes parameters associated with a current rotary engine speed and a throttle opening.

20. The multi-fuel engine according to claim 16, wherein the basic injection quantity is one of a set of reference basic injection quantities stored in the basic injection map that are empirically derived based on a particular alcohol concentration, and wherein the applied injection quantity calculator is configured to use the basic injection quantity regardless of whether the alcohol concentration actually determined by alcohol concentration-determining apparatus differs from the particular alcohol concentration.

* * * * *